United States Patent
Hashimoto et al.

(10) Patent No.: US 7,038,812 B2
(45) Date of Patent: May 2, 2006

(54) IMAGE PROCESSING APPARATUS, IMAGE FORMING APPARATUS, IMAGE PROCESSING METHOD, AND IMAGE FORMING METHOD THAT ALLOW FORMING OF AN APPROPRIATE IMAGE WITH SMALL AMOUNT OF RECORDING MATERIAL REMAINING

(75) Inventors: Hideyuki Hashimoto, Toyokawa (JP); Hiroshi Sumiyama, Aichi-Ken (JP); Tomokazu Kato, Toyokawa (JP); Eiichiro Kawasaki, Nagano-Ken (JP)

(73) Assignee: Minolta Co., Ltd., Osaka (JP)

( * ) Notice: Subject to any disclaimer, the term of this patent is extended or adjusted under 35 U.S.C. 154(b) by 971 days.

(21) Appl. No.: 09/790,704

(22) Filed: Feb. 23, 2001

(65) Prior Publication Data

US 2001/0021031 A1    Sep. 13, 2001

(30) Foreign Application Priority Data

Feb. 23, 2000   (JP)   .............................. 2000-046070

(51) Int. Cl.
*H04N 1/60* (2006.01)
*G06K 15/00* (2006.01)

(52) U.S. Cl. ...................................... 358/1.9; 358/1.14
(58) Field of Classification Search ............... 358/1.44; 382/239, 232
See application file for complete search history.

(56) References Cited

FOREIGN PATENT DOCUMENTS

| JP | 7-314783 A | 12/1995 |
|---|---|---|
| JP | 9-244475 A | 9/1997 |
| JP | 09-251231 | 9/1997 |
| JP | 9-288549 A | 11/1997 |
| JP | 10-026874 | * 1/1998 |
| JP | 11-072978 | 3/1999 |
| JP | 11-151833 A | 6/1999 |
| JP | 11-175283 A | 7/1999 |

* cited by examiner

*Primary Examiner*—Douglas Q. Tran
(74) *Attorney, Agent, or Firm*—Buchanan Ingersoll PC (57) ABSTRACT

Image data transmitted from an image reading portion or a personal computer is once stored in an image storage portion. Then, an image region determining portion performs region determination of the stored image data. In addition, a toner consumption calculating portion calculates an amount of toner to be consumed required for outputting the image data. Image correction is performed in an image correcting portion according to a determined image region based on a result of comparison between the amount of toner to be consumed calculated and the remaining amount of toner measured. Image output is performed in an image printing portion based on the corrected image data. As a result, image degradation can be minimized and an output operation can be completed even when a remaining amount of a recording material becomes less than an amount required for image output.

12 Claims, 7 Drawing Sheets

IMAGE PROCESSING APPARATUS, IMAGE FORMING APPARATUS, IMAGE PROCESSING METHOD, AND IMAGE FORMING METHOD THAT ALLOW FORMING OF AN APPROPRIATE IMAGE WITH SMALL AMOUNT OF RECORDING MATERIAL REMAINING

This application is based on application No. 2000-46070 filed in Japan, the content of which is hereby incorporated by reference.

BACKGROUND OF THE INVENTION

1. Field of the Invention

The present invention relates to an image processing apparatus, an image forming apparatus, an image processing method, and an image forming method, and more specifically, to an image processing apparatus, an image forming apparatus, an image processing method, and an image forming method for effecting an appropriate correction depending on an image region of image data based on a result of comparison between a remaining amount of a recording material such as a toner and an amount of the recording material to be consumed required for outputting image data stored in a memory.

2. Description of the Related Art

Conventionally, in the field of the image forming apparatus such as a digital copying machine, a variety of techniques have been proposed in order to avoid a situation in which the forming of an image is interrupted due to "toner empty" while an image is being output For instance, Japanese Patent Laying-Open No. 9-251231 proposes a technique in which an amount of toner required for outputting a job stored in a memory is calculated by a dot counter or the like, and this amount and a remaining amount of toner within a development device are compared so that an execution of a job is denied when the remaining amount of toner becomes smaller than the amount of toner required for outputting the job.

In addition, Japanese Patent Laying-Open No. 10-26874 discloses a technique in which image formation is performed with development biasing that limits an amount of toner to be consumed when a remaining amount of toner is reaches a prescribed value or below.

Furthermore, Japanese Patent Laying-Open No. 11-72978 presents a technique in which a image forming condition is changed based on a comparison between an amount of toner required for image output expected from image data stored in a memory and a remaining amount of toner.

The related art techniques described above, however, involve the following disadvantages.

First, with the technique indicated in Japanese Patent Laying-Open No. 9-251231, a job cannot be executed if the remaining amount of toner is not sufficiently greater than the amount to be consumed required for image output so that lack of toner even for image data of just one image disables outputting of the image data, and toner supply needs to be replenished.

Moreover, with the technique described in Japanese Patent Laying-Open No. 10-26874, when the remaining amount of toner reaches a prescribed value or below, development biasing of low consumption is inappropriately applied even when the remaining amount of toner is sufficient for outputting of an image within the memory.

Furthermore, with the technique described in Japanese Patent Laying-Open No. 11-72978, image forming conditions are switched uniformly based only on a comparison between the amount of toner to be consumed and the remaining amount of toner so that, even though a relatively good output of a character image is produced, drastic image degradation could possibly be caused in a region requiring texture as in a photograph image.

SUMMARY OF THE INVENTION

Thus, the object of the present invention is to provide an image processing apparatus that is capable of minimizing the degradation of an image while completing an output operation even when a remaining amount of a recording material becomes smaller than an amount required for image output, an image forming apparatus, an image processing method, and an image forming method, The above-described object of the present invention is achieved by an image processing apparatus including the following elements. In other words, according to one aspect of the present invention, an image processing apparatus for processing an image formed by an image forming apparatus that forms an image using a recording material includes a storage portion for storing image data, a region determining portion for determining an attribute of each region of the image data stored in the storage portion, a calculating portion for calculating an amount of the recording material required for forming by the image forming apparatus an image of the image data stored in the storage portion, an acquiring portion for acquiring a remaining amount of the recording material in the image forming apparatus, a comparing portion for comparing the amount of the recording material calculated by the calculating portion with the remaining amount of the recording material acquired by the acquiring portion to determine the need for correction of the image data stored in the storage portion, and a correcting portion for correcting, when the comparing portion determines that a correction is necessary, the image data stored in the storage portion using a method corresponding to a determined attribute and taking into account the amount of the recording material calculated and the remaining amount of the recording material acquired.

According to this aspect of the invention, the calculating portion calculates the amount of the recording material necessary for forming an image of the stored image data, and the acquiring portion acquires the actual remaining amount of the recording material. Then, the amount of the recording material required for image forming and the remaining amount of the recording material are compared and the need for correction is determined. If it is determined that correction is necessary, image correction is performed based on the result of comparison. Thus, image correction is appropriately performed even when the remaining amount of the recording material becomes smaller than the amount of the recording material required for image forming, and an image output operation is not discontinued.

In addition, region determining portion determines the attribute of each region of the image data, and the correcting portion performs the correction using a method corresponding to the determined attribute. Thus, deterioration of image quality due to uniform correction that takes no account of different image regions can be prevented and an output image with little overall image degradation can be obtained.

Therefore, it becomes possible to provide an image processing apparatus that is capable of minimizing degradation of an image while completing an output operation even when the remaining amount of the recording material becomes smaller than the amount required for image output.

The correcting portion preferably corrects image data using a different method for each determined region.

Consequently, the image data is appropriately corrected by the correcting portion according to the attribute of each region.

The correcting portion preferably compresses a dynamic range of image data.

The correcting portion more preferably compresses the dynamic range using a different compression ratio according to a determined attribute.

Thus, the dynamic range is compressed more appropriately by the correcting portion so that image correction can be accurately performed with an easy method.

Preferably, for a region determined by the region determining portion as being a character region, the correcting portion decides on a font to be used based on the amount of the recording material calculated by the calculating portion and the remaining amount of the recording material acquired by the acquiring portion.

In this way, for a character region, the font to be used can be appropriately decided based on the amount of the recording material calculated and the remaining amount of the recording material acquired. Thus, it becomes possible to minimize deterioration of image quality in the character region.

Preferably, for a region determined by the region determining portion as being a solid region, the correcting portion converts image data into dot data.

In this way, the image data is converted into dot data for a solid region. Thus, spending of the recording material in the solid region can be appropriately limited.

The region determining portion preferably determines, per page, a region of image data stored.

In this way, region determination of the image data is performed per page so that a strict determination within a page becomes unnecessary. Thus, it becomes possible to perform the region determination easily.

The correcting portion preferably performs image correction per job so that an output operation of one job can be performed without interruption.

In this way, image correction is performed per job so that a situation in which an output operation is interrupted while one job is being output can be prevented.

Preferably, when image data for a plurality of jobs are stored in a storage portion, the correcting portion performs image correction such that an output operation of the plurality of jobs can be performed without interruption.

In this way, when the image data for a plurality of jobs are stored in the storage portion, image correction is performed on the image data for the stored plurality of jobs as a unit. Thus, a situation in which an output operation is interrupted while a plurality of jobs are being output can be prevented.

According to another aspect of the present invention, an image forming apparatus includes an image forming portion for forming an image using a recording material, a storage portion for storing image data, a region determining portion for determining an attribute of each region of the image data stored in the storage portion, a calculating portion for calculating an amount of the recording material required for forming an image of the image data stored in the storage portion, a measuring portion for measuring a remaining amount of the recording material of the image forming portion, a comparing portion for comparing the amount of the recording material calculated by the calculating portion with the remaining amount of the recording material measured by the measuring portion to determine the need for correction of the image data stored in the storage portion, and a correcting portion for correcting, when the comparing portion determines that a correction is necessary, the image data stored in the storage portion using a method corresponding to a determined attribute and taking into account the amount of the recording material calculated and the remaining amount of the recording material measured.

According to this aspect of the invention, the calculating portion calculates the amount of the recording material necessary for forming an image of the stored image data, and the measuring portion measures the actual remaining amount of the recording material. Then, the amount of the recording material required for image forming and the remaining amount of the recording material are compared and the need for correction is determined. If it is determined that correction is necessary, image correction is performed based on the result of comparison. Thus, image correction is appropriately performed even when the remaining amount of the recording material becomes smaller than the amount of the recording material required for image forming, and an image output operation is not discontinued.

In addition, region determining portion determines the attribute of each region of the image data, and the correcting portion performs the correction using a method corresponding to the determined attribute. Thus, deterioration of image quality due to uniform correction that takes no account of different image regions can be prevented and an output image with little overall image degradation can be obtained.

Therefore, it becomes possible to provide an image forming apparatus that is capable of minimizing image degradation while completing an output operation even when the remaining amount of the recording material becomes smaller than the amount required for image output.

The correcting portion preferably corrects image data using a different method for each determined region.

Consequently, the image data is appropriately corrected by the correcting portion according to the attribute of each region.

The correcting portion preferably compresses a dynamic range of image data.

The correcting portion more preferably compresses the dynamic range using a different compression ratio according to a determined attribute.

Thus, the dynamic range is compressed more appropriately by the correcting portion so that image correction can be accurately performed with an easy method.

Preferably, for a region determined by the region determining portion as being a character region, the correcting portion decides on a font to be used based on the amount of the recording material calculated by the calculating portion and the remaining amount of the recording material measured by the measuring portion.

In this way, for a character region, the font to be used can be appropriately decided based on the amount of the recording material calculated and the remaining amount of the recording material measured. Thus, it becomes possible to minimize deterioration of image quality in the character region.

Preferably, for a region determined by the region determining portion as being a solid region, the correcting portion converts image data into dot data.

In this way, the image data is converted into dot data for a solid region. Thus, spending of the recording material in the solid region can be appropriately limited.

The region determining portion preferably determines, per page, a region of image data stored.

In this way, region determination of the image data is performed per page so that a strict determination within a page becomes unnecessary. Thus, it becomes possible to perform the region determination easily.

The correcting portion preferably performs image correction per job so that an output operation of one job can be performed without interruption.

In this way, image correction is performed per job so that a situation in which an output operation is interrupted while one job is being output can be prevented.

Preferably, when image data for a plurality of jobs are stored in a storage portion, the correcting portion performs image correction such that an output operation of the plurality of jobs can be performed without interruption.

In this way, when the image data for a plurality of jobs are stored in the storage portion, image correction is performed on the image data for the stored plurality of jobs as a unit. Thus, a situation in which an output operation is interrupted while a plurality of jobs are being output can be prevented.

The image forming apparatus preferably further includes a setting portion for setting an image forming condition of an image forming portion according to a determined region.

Thus, the image forming condition is set according to the determined region so that an appropriate image with minimum deterioration in image quality is formed.

In addition, according to a further aspect of the present invention, an image processing method for processing an image formed by an image forming apparatus that forms an image using a recording material includes storing image data in a storage portion, determining an attribute of each region of the image data stored in the storage portion, calculating an amount of the recording material required for forming by the image forming apparatus an image of the image data stored in the storage portion, acquiring a remaining amount of the recording material in the image forming apparatus, determining the need for correction of the image data stored in the storage portion by comparing the amount of the recording material calculated with the remaining amount of the recording material acquired, and correcting, when a correction is determined to be necessary, the image data stored in the storage portion using a method corresponding to a determined attribute and taking into account the amount of the recording material calculated and the remaining amount of the recording material acquired.

According to this aspect of the invention, it becomes possible to provide an image processing method that allows minimizing image degradation while completing an output operation even when the remaining amount of the recording material becomes smaller than the amount required for image output.

According to a still further aspect of the present invention, an image forming method includes storing image data in a storage portion, determining an attribute of each region of the image data stored in the storage portion, calculating an amount of the recording material required for forming an image of the image data stored in the storage portion, measuring a remaining amount of the recording material of an image forming portion, determining the need for correction of the image data stored in the storage portion by comparing the amount of the recording material calculated by a calculating portion with the remaining amount of the recording material measured by a measuring portion, correcting, when a comparing portion determines that a correction is necessary, the image data stored in the storage portion using a method corresponding to a determined attribute and taking into account the amount of the recording material calculated and the remaining amount of the recording material measured, and forming an image of the corrected image data.

According to this aspect of the invention, it becomes possible to provide an image forming method that allows minimizing image degradation while completing an output operation even when the remaining amount of the recording material becomes smaller than the amount required for image output.

According to an even further aspect of the present invention, an image processing apparatus for processing an image formed by an image forming apparatus that forms an image using a recording material includes a storage portion for storing image data, a calculating portion for calculating an amount of the recording material required for forming by the image forming apparatus an image of the image data stored in the storage portion, an acquiring portion for acquiring a remaining amount of the recording material in the image forming apparatus, and a compressing portion for compressing a dynamic range of the image data stored in the storage portion using a compression ratio based on the amount of the recording material calculated by the calculating portion and the remaining amount of the recording material acquired by the acquiring portion.

According to this aspect of the invention, the calculating portion calculates the amount of the recording material necessary for forming an image of the stored image data, and the acquiring portion acquires the actual remaining amount of the recording material. Then, the amount of the recording material required for image forming and the remaining amount of the recording material are compared, and based on the result of comparison, the dynamic range of the image data is compressed. Thus, image correction is appropriately performed with an easy method even when the remaining amount of the recording material becomes smaller than the amount of the recording material required for image forming, and an image output operation is not discontinued.

Therefore, it becomes possible to provide an image processing apparatus that is capable of minimizing image degradation while completing an output operation even when the remaining amount of the recording material becomes smaller than the amount required for image output.

According to a still further aspect of the present invention, an image processing apparatus for processing an image formed by an image forming apparatus that forms an image using a recording material includes a storage portion for storing image data, a calculating portion for calculating an amount of the recording material required for forming by the image forming apparatus an image of the image data stored in the storage portion, an acquiring portion for acquiring a remaining amount of the recording material in the image forming apparatus, and a deciding portion for deciding on a font to be used based on the amount of the recording material calculated by the calculating portion and the remaining amount of the recording material acquired by the acquiring portion.

According to this aspect of the invention, the calculating portion calculates the amount of the recording material necessary for forming an image of the stored image data, and the acquiring portion acquires the actual remaining amount of the recording material. Then, the amount of the recording material required for image forming and the remaining amount of the recording material are compared, and based on the result of comparison, the font to be used is decided. Thus, a character is appropriately formed with an easy method even when the remaining amount of the recording material becomes smaller than the amount of the recording material required for image forming, and an image output operation is not discontinued.

Therefore, it becomes possible to provide an image processing apparatus that is capable of minimizing image degradation while completing an output operation even when the remaining amount of the recording material becomes smaller than the amount required for image output.

According to an even further aspect of the present invention, an image forming apparatus includes an image forming portion for forming an image using a recording material, a storage portion for storing image data, a calculating portion for calculating an amount of the recording material required for forming an image of the image data stored in the storage portion, a measuring portion for measuring a remaining amount of the recording material of the image forming portion, and a compressing portion for compressing a dynamic range of the image data stored in the storage portion using a compression ratio based on the amount of the recording material calculated by the calculating portion and the remaining amount of the recording material measured by the measuring portion.

According to this aspect of the invention, the calculating portion calculates the amount of the recording material necessary for forming an image of the stored image data, and the measuring portion measures the actual remaining amount of the recording material. Then, the amount of the recording material required for image forming and the remaining amount of the recording material are compared, and based on the result of comparison, the dynamic range of the image data is compressed. Thus, image correction is appropriately performed with an easy method even when the remaining amount of the recording material becomes smaller than the amount of the recording material required for image forming, and an image output operation is not discontinued.

Therefore, it becomes possible to provide an image forming apparatus that is capable of minimizing image degradation while completing an output operation even when the remaining amount of the recording material becomes smaller than the amount required for image output.

According to a still further aspect of the present invention, an image forming apparatus includes an image forming portion for forming an image using a recording material, a storage portion for storing image data, a calculating portion for calculating an amount of the recording material required for forming an image of the image data stored in the storage portion, a measuring portion for measuring a remaining amount of the recording material of the image forming portion, and a deciding portion for deciding on a font to be used based on the amount of the recording material calculated by the calculating portion and the remaining amount of the recording material measured by the measuring portion.

According to this aspect of the invention, the calculating portion calculates the amount of the recording material necessary for forming an image of the stored image data, and the measuring portion measures the actual remaining amount of the recording material. Then, the amount of the recording material required for image forming and the remaining amount of the recording material are compared, and based on the result of comparison, the font to be used is decided. Thus, a character is appropriately formed with an easy method even when the remaining amount of the recording material becomes smaller than the amount of the recording material required for image forming, and an image output operation is not discontinued.

Therefore, it becomes possible to provide an image forming apparatus that is capable of minimizing image degradation while completing an output operation even when the remaining amount of the recording material becomes smaller than the amount required for image output.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, the embodiments of the present invention will be described with reference to the drawings.

Figure 1:
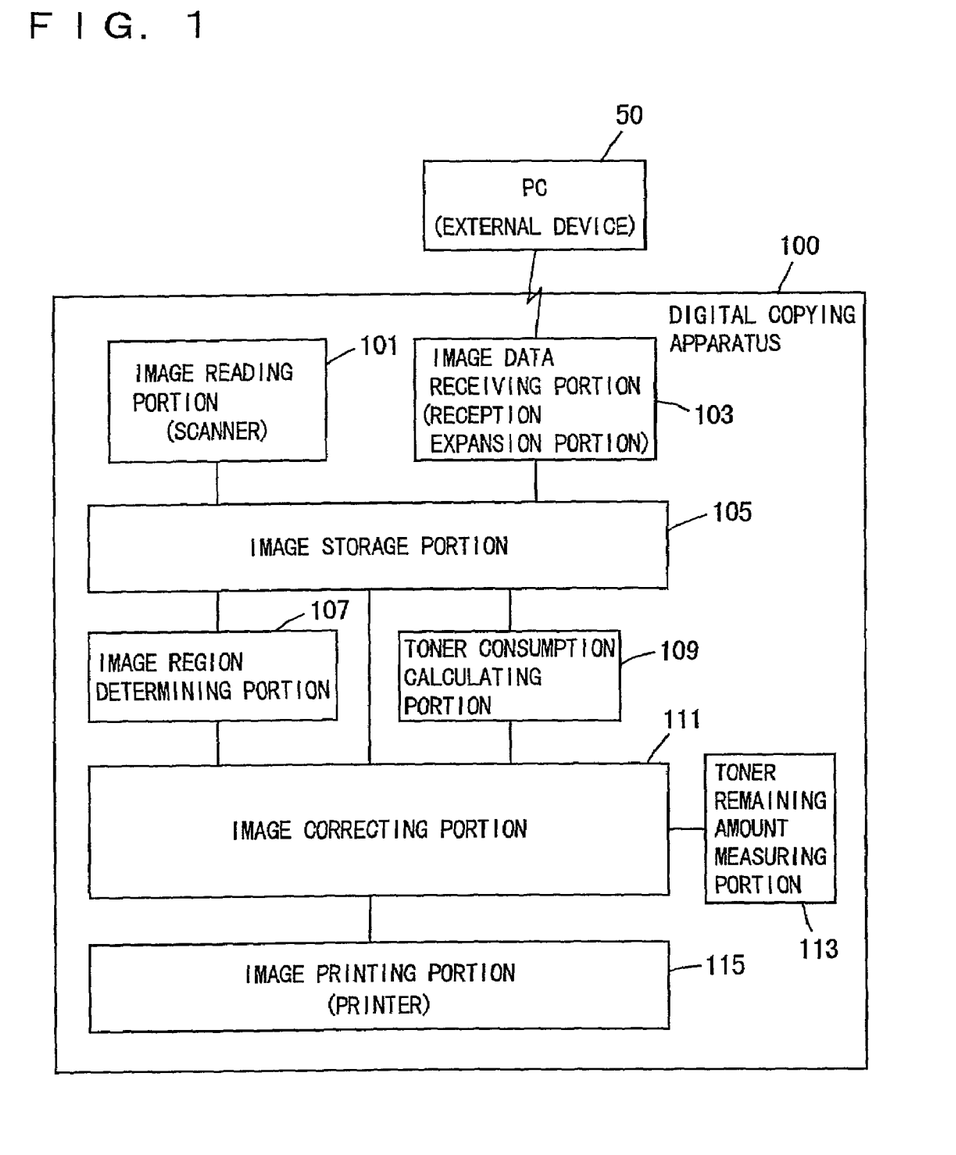
FIG. 1 is a schematic block diagram representing an overall arrangement of a digital copying apparatus according to an embodiment of the present invention.

As shown in FIG. 1, a digital copying apparatus 100 includes an image reading portion 101 such as a scanner, image data receiving portion 103 for receiving image data transmitted from a PC 50 which is an external device, an image storage portion 105 for storing the image data from image reading portion 101 and the image data from image data receiving portion 103, an image region determining portion 107 for determining a region of the image data stored in image storage portion 105, and a toner consumption calculating portion 109 for calculating an amount of toner to be consumed by the image data stored in image storage portion 105.

Image data taken in by image reading portion 101 and image data transmitted from PC 50 are once stored in image storage portion 105. Then, image region determining portion 107 determines the image data, for instance, as being a character region, a solid region, a photograph region, or the like. In addition, toner consumption calculating portion 109 calculates an amount of toner to be consumed Tw required for outputting (recording onto a recording paper) the image data stored in image storage portion 105.

Here, the amount of toner to be consumed Tw can be calculated from image data with each pixel data being represented by multi-valued data, or from the number of pixels of image data after each pixel data is binarized. In addition, the amount of toner to be consumed can be calculated accurately per image region determined, using any calculating method.

Digital copying apparatus 100 further includes an image correcting portion 111 for correcting image data, a toner remaining amount measuring portion 113 for measuring a remaining amount of toner, and an image printing portion (printer) 115 for outputting an image based on image data.

The image data once stored in image storage portion 105 is sent to image correcting portion 111. Then, image correction is performed according to an image region determined by image region determining portion 107 based on a result of comparison between the amount of toner to be consumed Tw calculated by toner consumption calculating portion 109 and a remaining amount of toner Tr measured by toner remaining amount measuring portion 113.

Thus, when amount of toner to be consumed Tw becomes greater than remaining amount of toner Tr, appropriate correction is performed on the image data sent from image storage portion 105 depending on the image region being a character image, a photograph image, or the like. The image data after correction is sent to image printing portion 115, and image output printing) based on the data is performed.

Figure 2:
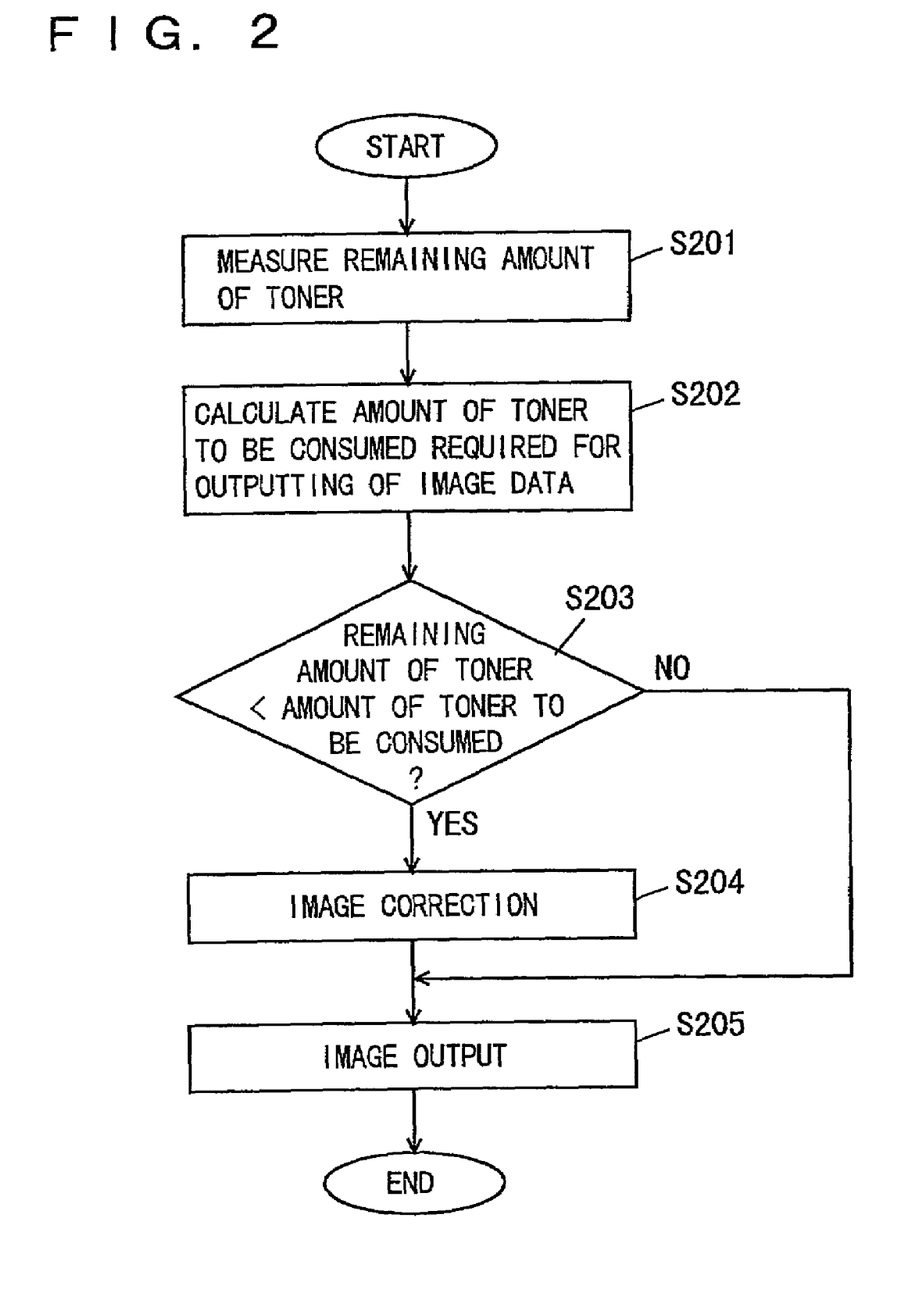
FIG. 2 is a flow chart showing the flow of processing of how the digital copying apparatus performs image correction.

FIG. 2 is a flow chart showing the flow of processing of how digital copying apparatus 100 performs image correction. As shown in FIG. 2, digital copying apparatus 100 in step S201 first measures remaining amount of toner Tr within a development device using toner remaining amount measuring portion 113.

Then, in step S202, toner consumption calculating portion 109 calculates amount of toner to be consumed Tw required for outputting of image data. Thereafter, in step S203, remaining amount of toner Tr measured and amount of toner to be consumed Tw calculated are compared.

In other words, it is determined whether remaining amount of toner Tr is smaller than amount of toner to be consumed Tw in order to determine whether image output is possible or not using the current remaining amount of toner. When remaining amount of toner Tr is determined to be smaller than amount of toner to be consumed Tw, image correction suitable for the determined region is performed on the image data in step S204, since there would be a shortage of toner if image output is performed without the correction.

On the other hand, when remaining amount of toner Tr is greater than amount of toner to be consumed Tw, then image output can be directly performed so that the image correction processing of step S204 is skipped and image output processing of step S205 is performed. In step S205, image printing portion 115 performs the image output based on corrected image data or uncorrected image data.

Now, a specific image correction method in image correcting portion 111 will be described with reference to FIGS. 3 to 7.

Figure 3:
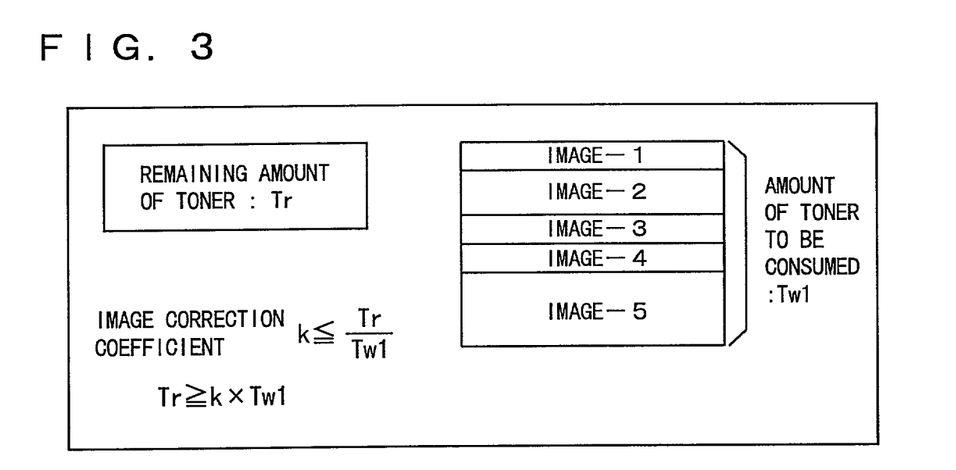
FIG. 3 is a diagram related to a description of a method of correction in an image correcting portion when the results of region determination of image data are the same.

FIG. 3 is a diagram related to a description of a method of correction in image correcting portion 111 when the results of region determination of image data are the same. FIG. 3 shows a case in which image data for one job consisting of images 1 to 5 is stored in image storage portion 105. The image data in this job are all determined by image region determining portion 107 to be of the same image region, such as all being character regions or all being photograph regions, for example.

An amount of toner to be consumed that is required for all image data for images 1 to 5 calculated by toner consumption calculating portion 109 is Tw1. On the other hand, the actual remaining amount of toner measured by toner remaining amount measuring portion 113 is Tr.

When remaining amount of toner Tr is smaller than amount of toner to be consumed Tw1, image correcting portion 111 performs a correction in which a dynamic range of image data is compressed by k times. Here, image correction coefficient k is a value set to satisfy a relation of $k \leq Tr/Tw1$.

Consequently, amount of toner, $k \times Tw1$, required for outputting all image data of one job stored in image storage portion 105 is below remaining amount of toner Tr ($Tr \geq k \times Tw1$) so that it becomes possible to output all image data with the remaining toner. Thus, a situation in which image output is interrupted due to toner empty during execution of one job can be avoided.

Figure 4:
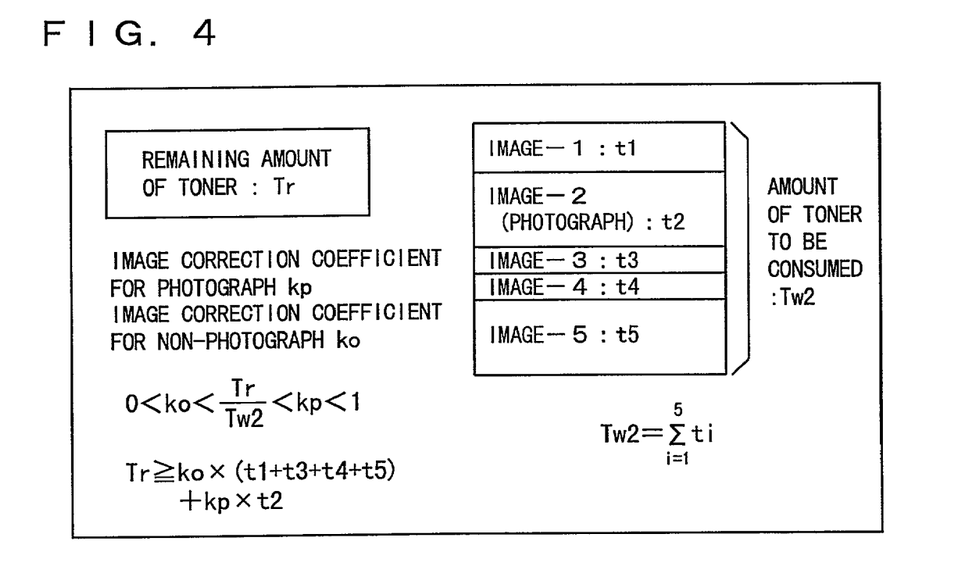
FIG. 4 is a diagram related to a description of a method of correction in the image correcting portion when image regions that are different/differ? per image coexist within image data.

FIG. 4 is a diagram related to a description of a method of correction in image correcting portion 111 when image regions that are different per image coexist within image data. As shown in FIG. 4, image data for one job consisting of images 1 to 5 is stored in image storage portion 105 in this case as well. Among the image data in this job, however, images 1, 3, 4, and 5 are determined by image region determining portion 107 to be non-photograph regions such as of characters, while image 2 is determined to be a photograph region.

The respective amounts of toner to be consumed for images 1 to 5 calculated by toner consumption calculating portion 109 are t1 to t5, while an amount of toner to be consumed required for all image data is Tw2. On the other hand, the actual remaining amount of toner measured by toner remaining amount measuring portion 113 is Tr.

When remaining amount of toner Tr is smaller than amount of toner to be consumed Tw2, image correcting portion 111 performs a correction in which dynamic ranges of image data are compressed according to image regions.

In other words, for image data of a region determined to be a photograph region, a dynamic range is compressed by kp times, while for image data of a region determined to bee non-photograph region, a dynamic range is compressed by k0 times. Here, image correction coefficients kp and k0 are values set to satisfy a relation of $0 < k0 < Tr/Tw2 < kp < 1$.

Thus, the dynamic ranges of a photograph region and a character region are not compressed using the compression ratio; instead, a compression ratio kp for a photograph region is set to be smaller than a compression ratio k0 for a non-photograph region. Since a region determined to be a photograph region requires texture in comparison with a region determined to be a character region so that a reduction rate for the amount of toner to be consumed for the region determined to be a photograph region need to be limited to a small value in order to prevent degradation of image quality.

In this way, an amount of toner, $k0 \times (t1+t3+t4+t5)+kp \times t2$, required for outputting all image data corrected using different compression ratios is less than remaining amount of toner Tr ($Tr \geq k0 \times (t1+t3+t4+t5) + kp \times t2$), and it becomes possible to output all image data with the remaining toner. Thus, a situation in which image output becomes impossible due to toner empty during execution of one job can be avoided in this case as well. In addition, loss of texture required for a photograph image can be inhibited as much as possible, since compression that is appropriate for each image region is performed.

Figure 5:
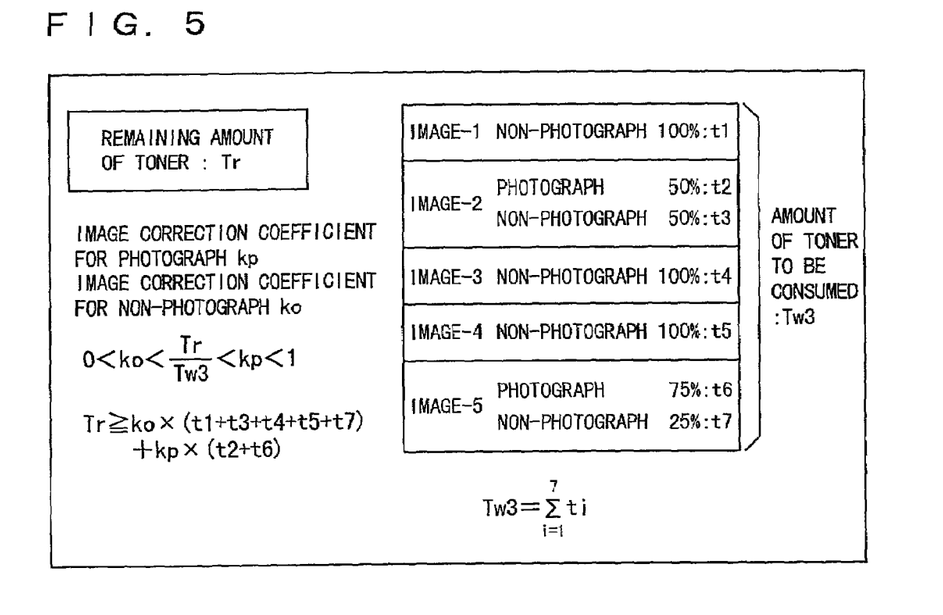
FIG. 5 is a diagram related to a description of a method of correction in the image correcting portion when different image regions coexist within an image of the image data.

FIG. 5 is a diagram related to a description of a method of correction in image correcting portion 111 when different image regions coexist within an image of the image data. As shown in FIG. 5, image data for one job consisting of images 1 to 5 is stored in image storage portion 105 in this case as well.

Among the image data in this job, however, images 1, 3, and 4 are determined by image region determining portion 107 to be formed by non-photograph regions alone such as of characters, while images 2 and 5 are determined to have a photograph region and a non-photograph region coexisting therein.

Specifically, a photograph region and a non-photograph region each occupy 50 percent of image 2, while in an image 5, the photograph region occupies 75 percent and the non-photograph region occupies 25 percent.

The respective amounts of toner to be consumed for the respective image regions in images 1 to 5 calculated by toner consumption calculating portion 109 are t1 to t7, and an amount of toner to be consumed required for all image data is Tw3. On the other hand, the actual remaining amount of toner measured by toner remaining amount measuring portion 113 is Tr.

When remaining amount of toner Tr is smaller than amount of toner to be consumed Tw3, image correcting portion 111 performs a correction in which dynamic ranges of image data are compressed according to image regions.

In other words, for image data of a region determined to be a photograph region, a dynamic range is compressed by kp times, while for image data of a region determined to be a non-photograph region, a dynamic range is compressed by k0 times which is a compression ratio greater than kp times. Image correction coefficients kp and k0 are values set to satisfy a relation of 0<k0<Tr/Tw3<kp<1.

Compression ratio kp for a photograph region is set to be smaller than compression ratio k0 for a non-photograph region such that texture necessary for the photograph region can be maintained while degradation of image quality can be prevented.

In this way, an amount of toner, k0×(t1+t3+t4+t5+t7)+kp×(t2+t6), required for outputting all image data corrected using different compression ratios is less than remaining amount of toner Tr (Tr≧k0×(t1+t3+t4+t5+t7)+kp×(t2+t6)) so that it becomes possible to output all image data with the remaining toner.

Thus, even in the case in which a photograph region and a non-photograph region coexist within one image, image degradation can be minimized, while at the same time, a situation where image output becomes impossible due to toner empty during execution of one job can be avoided.

Figure 6:
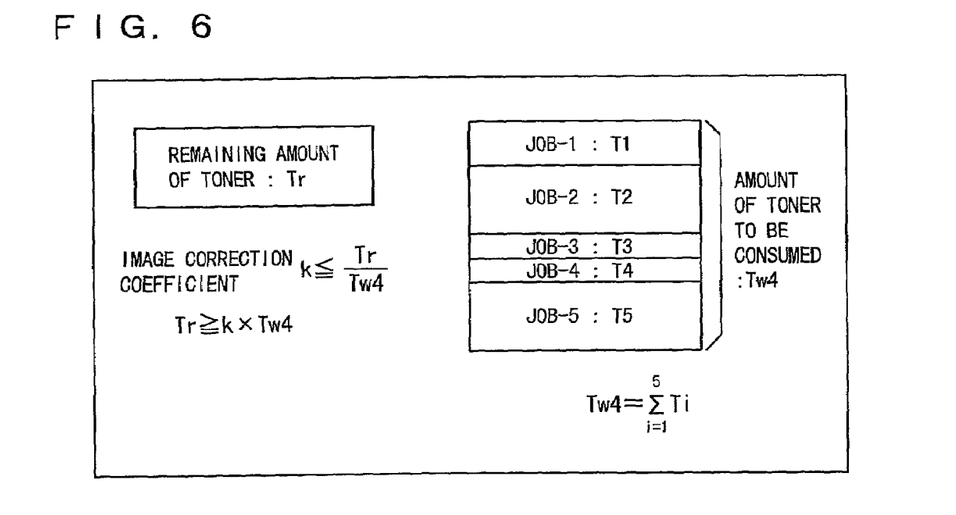
FIG. 6 is a diagram related to a description of a method of correction in the image correcting portion when image data for a plurality of jobs are stored in the image storage portion and the results of region determination of the respective jobs are the same.

FIG. 6 is a diagram related to a description of a method of correction in image correcting portion 111 when image data for a plurality of jobs are stored in image storage portion 105 and the results of region determination of the respective jobs are the same. Here, FIG. 5 shows a case in which image data for a plurality of jobs of JOB1 to JOB5 are stored in image storage portion 105. The image data for these jobs are determined by image region determining portion 107 to be of the same image region, such as all being character regions or all being photograph regions, for instance.

The respective amounts of toner to be consumed that is required for outputting of JOBs 1 to 5 calculated by toner consumption calculating portion 109 are T1 to T5, while an amount of toner to be consumed required for all image data is Tw4. On the other hand, the actual remaining amount of toner measured by toner remaining amount measuring portion 113 is Tr.

When remaining amount of toner Tr is smaller than amount of toner to be consumed Tw4, image correcting portion 111 performs a correction in which a dynamic range of image data is compressed by k times. Here, image correction coefficient k is a value set to satisfy a relation of k≦Tr/Tw4.

In this way, when image regions contained in each job are all the same, compression of a dynamic range is performed simply with the same compression ratio for all regions, as in the case shown in FIG. 3.

An amount of toner, k×Tw4, required for outputting all image data of five jobs stored in image storage portion 105 is below remaining amount of toner Tr (Tr≧k×Tw4) so that it becomes possible to output all image data with the remaining toner. Thus, a situation in which image output becomes impossible due to toner empty during execution of five jobs can be avoided.

Figure 7:
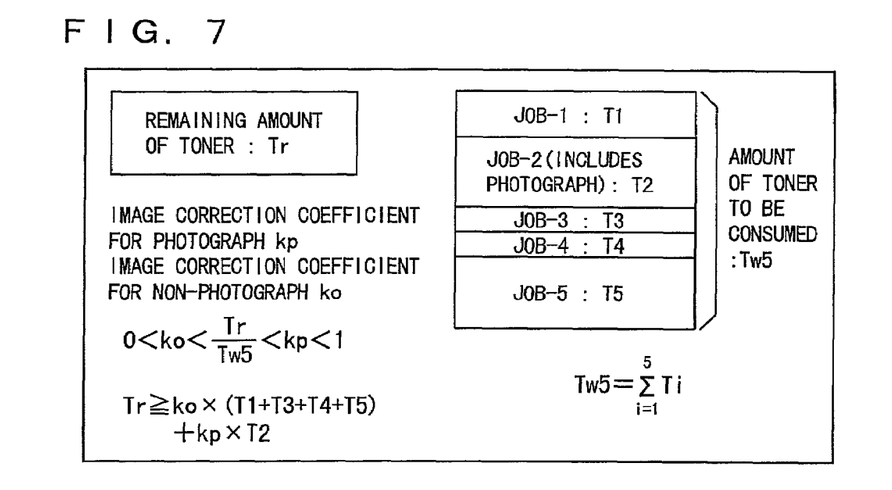
FIG. 7 is a diagram related to a description of a method of correction in the image correcting portion when image data for a plurality of jobs are stored in the image storage portion and different image regions coexist within a job.

FIG. 7 is a diagram related to a description of a method of correction in image correcting portion 111 when image data for a plurality of jobs are stored in image storage portion 105 and different image regions coexist within a job.

As shown in FIG. 7, here also, image data for a plurality of jobs of JOB1 to JOB5 are stored in image storage portion 105. Among the plurality of jobs, however, JOBs 1, 3, 4, and 5 consist of non-photograph image regions such as of characters, while JOB2 includes a photograph image region.

The respective amounts of toner to be consumed for the respective JOBs 1 to 5 calculated by toner consumption calculating portion 109 are T1 to T5, and an amount of toner to be consumed required for all image data is Tw5. On the other hand, the actual remaining amount of toner measured by toner remaining amount measuring portion 113 is Tr.

When remaining amount of toner Tr is smaller than amount of toner to be consumed Tw5, image correcting portion 111 performs a correction in which dynamic ranges of image data are compressed according to image regions.

In other words, for image data of a job determined to contain a photograph region, a dynamic range is compressed by kp times, while for image data of a job determined to contain only non-photograph regions, the dynamic range is compressed by k0 times which is a greater compression ratio than kp times. Here, image correction coefficients kp and k0 are values set to satisfy a relation of 0<k0<Tr/Tw5<kp<1.

Compression ratio kp for image data of a job containing a photograph region is set to be smaller than compression ratio k0 for image data of a job containing only non-photograph regions such that texture necessary for the photograph image can be maintained while degradation of image quality can be prevented.

In this way, an amount of toner, k0×(T1+T3+T4+T5)+kp×T2, required for outputting all image data of a plurality of jobs corrected using different compression ratios is less than remaining amount of toner Tr (Tr≧k0×(T1+T3+T4+T5)+kp×T2), and it becomes possible to output image data for all jobs with the remaining toner.

Thus, even in the case in which a plurality of jobs are registered and a photograph image is contained within one of the jobs, image degradation can be minimized, while at the same time, a situation where image output becomes impossible due to toner empty during execution of the jobs can be avoided.

As described above, compression of a dynamic range is performed for image data stored in image storage portion 105 based on a result of determination by image region determining portion 107 and using an image correction coefficient appropriate for each image region. As a result, it becomes possible to minimize image degradation.

Moreover, inconvenient interruption of image output operation in the middle of outputting of jobs stored in image storage portion 105 can be prevented.

In addition, when a photograph image is contained within one job, an image correction coefficient is not set per job as shown in FIG. 7 but is set per image (or page) as shown in FIG. 4.

Furthermore, when a photograph image is contained within an image (one page) of one job, i.e. when the image (one page) does not entirely consist of a photograph region but a photograph region and a character region coexist therein, an image correction coefficient is not set per job or per image (page) but may be set per image region as shown in FIG. 5.

Thus, by setting a correction coefficient for a smaller unit, image correction can be performed more accurately according to the image regions so that image can be output with appropriate toner distribution.

In addition, although an example is shown here in which image regions of image data are determined to be either of the two kinds of regions, a character region and a photograph region, the determination is not limited to these two kinds of regions. In other words, image regions of the image data can be determined as some other regions according to need, such as a solid region and so on.

First Modification

Now, other image correction methods employed by image correcting portion 111 for image data that is determined to be a character region by image region determining portion 107 will be described. Here, instead of changing a dynamic range of image data, a font itself is changed to perform a correction of the image data.

Figure 8:
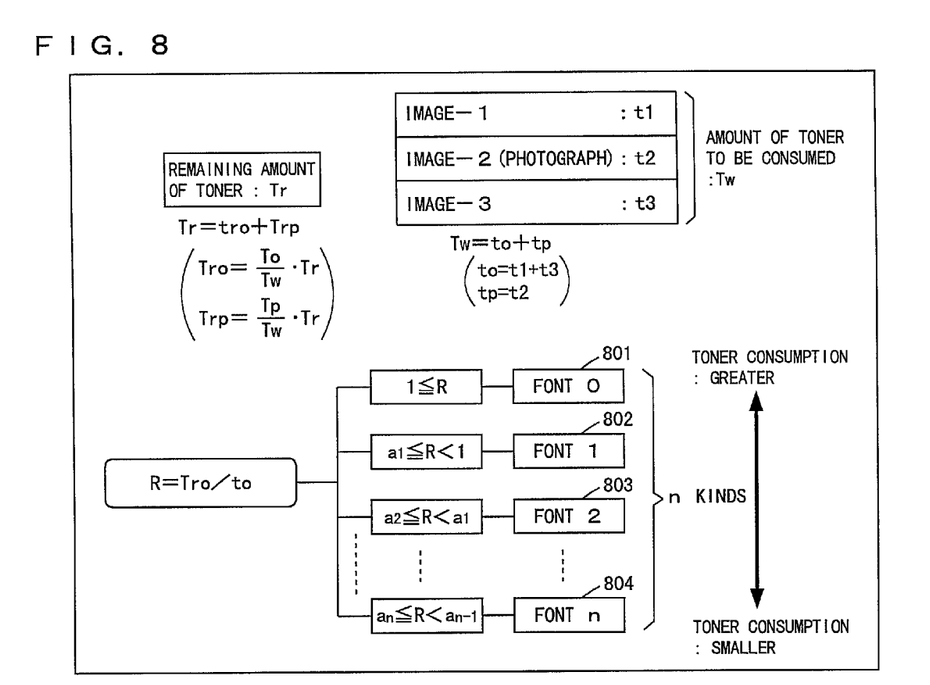
FIG. 8 is a diagram related to a description of a case in which image data is corrected by changing a font.

FIG. 8 is a diagram related to a description of a case in which image data is corrected by changing the font. As shown in FIG. 8, image data stored in image storage portion 105 include images 1 and 3 formed only of character regions and an image 2 formed only of a photograph region.

An amount of toner to be consumed that is required for outputting image data of a character region and an amount of toner to be consumed that is required for outputting image data of a photograph region calculated by toner consumption calculating portion 109 respectively are t0 and tp, while an amount of toner to be consumed required for all image data is Tw. Moreover, it is assumed that the remaining amount of toner measured by toner remaining amount measuring portion 113 is Tr.

At this time, remaining amount of toner Tr is divided into remaining amount of toner for a character region Tr0 and remaining amount of toner for a photograph region Trp based on a proportion of an amount of toner to be consumed for a character region t0 and an amount of toner to be consumed for a photograph region tp (Tr0=(t0/Tw)·Tr, Trp=(tp/Tw)·Tr). Then, in order to decide which font is to be used, a ratio R for remaining amount of toner for a character region Tr0 and amount of toner to be consumed for a character region t0 is derived (R=Tr0/t0).

The n kinds of font made available are font 0 to font n in the order of greater amount of toner consumption. It is decided which one of these fonts is to be used based on ratio R of remaining amount of toner for a character region Tr0 and amount of toner to be consumed for a character region t0.

If $1 \leq R$, then a font 0 with the greatest amount of toner consumption is selected (801), and if $a1 \leq R < 1$, then a font 1 with the second greatest amount of toner consumption is selected (802). If $a2 \leq R < a1$, then a font 2 with the third greatest amount of toner consumption is selected (803). Moreover, if an $\leq R < an-1$, then a font n with the smallest amount of toner consumption is selected (804).

In this way, for image data determined by image region determining portion 107 to be a character region, the fonts to be used are switched based on ratio R of remaining amount of toner for a character region Tr0 and amount of toner to be consumed for a character region t0.

Thus, since an image can be output using an appropriate font even when the calculated amount of toner to be consumed is great, character recognition can be facilitated, while at the same time, the amount of toner consumption can be reduced.

Second Modification

Now, an image correction method employed by image correcting portion 111 for image data that is determined as being a solid region by image region determining portion 107 will be described. Here, also, image correction is performed not by changing a dynamic range of image data but instead by changing the image data corresponding to a solid region which is a uniform image region into dot data.

Figure 9:
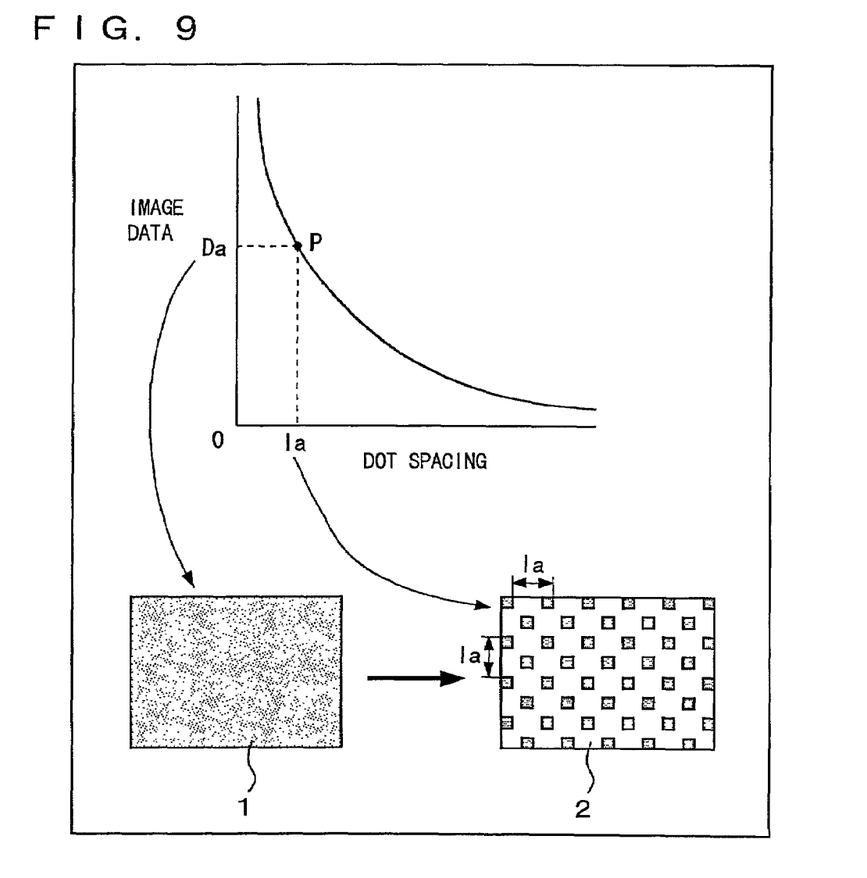
FIG. 9 is a diagram related to a description of a case in which image correction is performed by converting image data of a solid region into corresponding dot data.

FIG. 9 is a diagram related to a description of a case in which image correction is performed by converting image data of a solid region into corresponding dot data. The graph of FIG. 9 shows the relation between dot spacing of dot data and image data of the solid region. The image data of a solid region is changed into dot data of corresponding dot spacing according to the relation shown in this graph.

For instance, from a point P on the graph, image data of Da would be converted into dot data of a corresponding dot spacing Ia. Thus, an image of a solid region as indicated by 1 in which image data is Da would be changed into an image of a dot region as shown by 2 in which the dot spacing is Ia.

In this way, image data determined by image region determining portion 107 to be a solid region is changed into dot data according to a relation as shown in FIG. 9. Thus, even when remaining amount of toner Tr becomes less than amount of toner to be consumed Tw, it becomes possible appropriately to reduce toner consumption by converting a solid image into a dot image.

Third Modification

Finally, a method will be described in which a correction is performed according to the image region by changing an image forming condition employed by image printing portion 115, instead of having image data stored in image storage portion 105 corrected by image correcting portion 111.

As used herein, changing an image forming condition refers to changing any one condition or a plurality of conditions for an image forming process in image printing portion 115. For instance, changing of development bias potential and changing of an amount of electrostatic charge of toner among others are contemplated.

Figure 10:
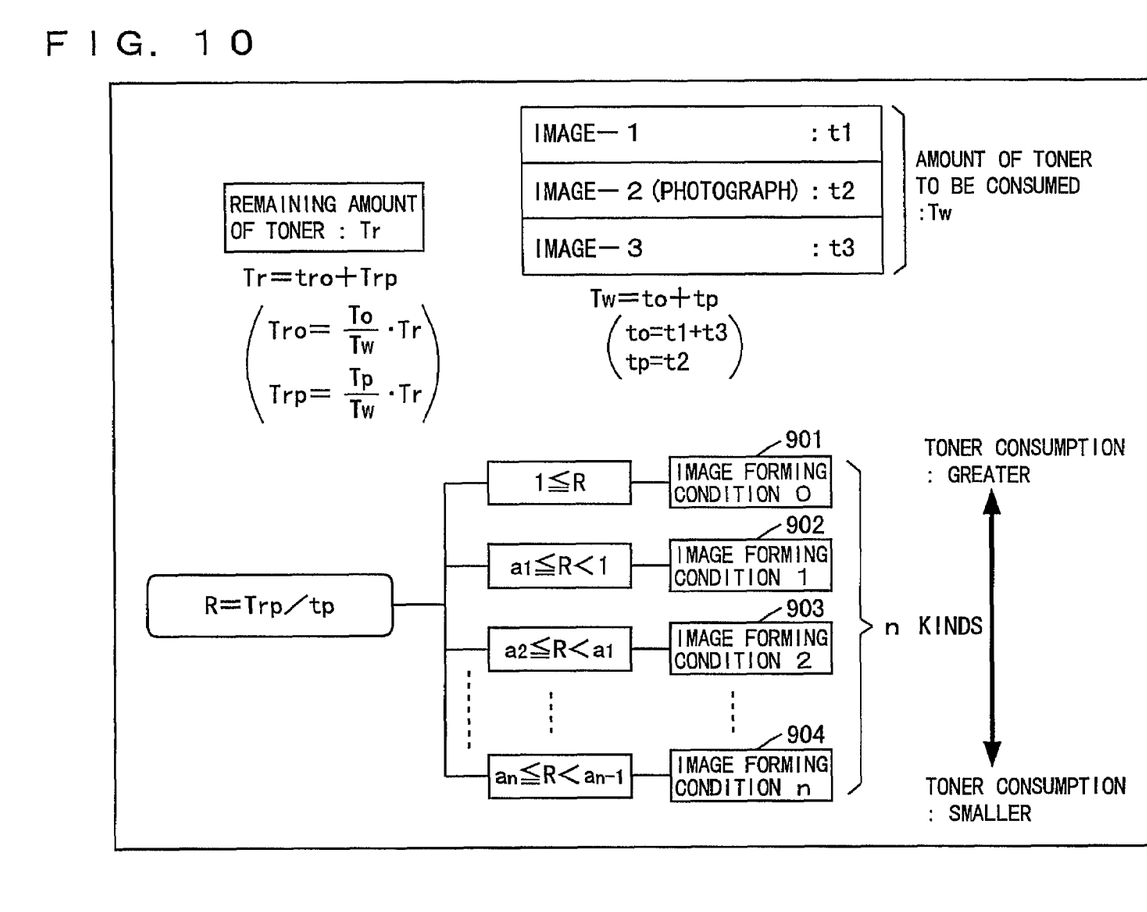
FIG. 10 is a diagram related to the description of a case in which image correction is performed by changing a image forming condition.

FIG. 10 is a diagram related to the description of a case in which image correction is performed by changing a image forming condition. As shown in FIG. 10, image data stored in image storage portion 105 include images 1 and 3 formed only of character regions and an image 2 formed only of a photograph region.

An amount of toner to be consumed that is required for outputting image data of a character region and an amount of toner to be consumed that is required for outputting image data of a photograph region calculated by toner consumption calculating portion 109 respectively are t0 and tp, and an amount of toner to be consumed required for all image data is Tw. Moreover, it is assumed that the remaining amount of toner measured by toner remaining amount measuring portion 113 is Tr.

At this time, remaining amount of toner Tr is divided into remaining amount of toner for a character region Tr0 and remaining amount of toner for a photograph region Trp based on a proportion of an amount of toner to be consumed for a character region t0 and an amount of toner to be consumed for a photograph region tp (Tr0=(t0/Tw)·Tr, Trp=(tp/Tw)·Tr). Then, in order to decide which image forming condition is to be used for a photograph region, a ratio R for remaining amount of toner for a photograph region Trp and an amount of toner to be consumed for a photograph region tp is derived (R=Trp/tp).

The n kinds of image forming conditions made available are an image forming condition 0 to an image forming condition n in the order of greater amount of toner consumption. It is decided which one of these image forming conditions is to be used based on ratio R of remaining amount of toner for a photograph region Trp and amount of toner to be consumed for a photograph region tp.

If $1 \leq R$, then image forming condition 0 with the greatest amount of toner consumption is selected (901), and if $a1 \leq R < 1$, then image forming condition 1 with the second greatest amount of toner consumption is selected (902). If $a2 \leq R < a1$, then image forming condition 2 with the third greatest amount of toner consumption is selected (903). Moreover, if $an \leq R < an-1$, for example, then image forming condition n with the smallest amount of toner consumption is selected (904).

In this way, for image data determined by image region determining portion 107 to be a photograph region, an image forming condition to be used is selected based on ratio R of remaining amount of toner for a photograph region Trp and amount of toner to be consumed for a photograph region tp, and image output is performed based on this image forming condition.

Thus, an image can be output using an appropriate image forming condition even when the calculated amount of toner to be consumed is great so that, as regards a photograph region in an output image, the output image without loss of texture can be obtained.

Similarly, when a result of determination of an image region by image region determining portion 107 indicates a character region, an image forming condition to be used is selected based on a ratio decided by remaining amount of toner for a character region Tr0 and amount of toner to be consumed for a character region t0. Then, a character image is output using the selected image forming condition.

In addition, an appropriate image forming condition predetermined for each region is selected by a similar method for a solid region and for other regions.

Thus, according to this modification, appropriate image forming condition corresponding to an image region of image data can be set, and image output based on this appropriate image forming condition can be performed. As a result, it becomes possible to limit toner consumption as well as to minimize image degradation.

Moreover, the method of switching image forming conditions in image printing portion 115 described in this modification can be used together with a method of correcting image data in image correcting portion 111 previously described.

By using both methods together, an image output operation would not be interrupted in the middle and more appropriate image correction corresponding to an image region becomes possible even when amount of toner to be consumed Tw calculated becomes greater than remaining amount of toner Tr measured.

Furthermore, according to the present embodiments, a case is described in which a normal electrophotographic mode is employed as an image forming mode for image printing portion 115; however, other modes such as an ink-jet mode, for example, may be employed.

When the ink-jet mode is employed, toner consumption calculating portion 109 and toner remaining amount measuring portion 113 shown in FIG. 1 would become an ink consumption calculating portion 109 for calculating an amount of ink to be consumed and an ink remaining amount measuring portion 113 for measuring a remaining amount of ink. Moreover, instead of changing of an image forming condition shown in the third modification, changing of drive voltage, drive waveform and so on in causing ink discharge may be contemplated.

In addition, according to the present embodiments, as shown in FIG. 1, image region determining portion 107 performs a region determination of determining image data stored in image storage portion 105 as being a character region, a photograph region, a solid region, and so on. The regions, however, may be determined based on other attributes of an image such as being middle tone, being binary, and so on, for instance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus for processing an image formed by an image forming apparatus that forms an image using a recording material, comprising:
   a storage portion for storing image data;
   a region determining unit for determining an attribute of each region of the image data stored in said storage portion;
   a calculating unit for calculating an amount of the recording material required for forming by said image forming apparatus an image of the image data stored in said storage portion;
   an acquiring unit for acquiring a remaining amount of the recording material in said image forming apparatus;
   a comparing unit for comparing the amount of the recording material calculated by said calculating unit with the remaining amount of the recording material acquired by said acquiring unit to determine a need for correction of the image data stored in said storage portion; and
   a correcting unit for correcting, when said comparing unit determines that a correction is necessary, the image data stored in said storage portion using a method corresponding to said determined attribute and taking into account said amount of the recording material calculated and said remaining amount of the recording material acquired.

2. The image processing apparatus according to claim 1, wherein said correcting unit corrects image data using a different method for each of said determined region.

3. The image processing apparatus according to claim 1, wherein said correcting unit compresses a dynamic range of image data.

4. The image processing apparatus according to claim 3, wherein said correcting unit compresses the dynamic range using a different compression ratio according to said determined attribute.

5. The image processing apparatus according to claim 1, wherein for a region determined by said region determining unit as being a character region, said correcting unit decides on a font to be used based on the amount of the recording material calculated by said calculating unit and the remaining amount of the recording material acquired by said acquiring unit.

6. The image processing apparatus according to claim 1, wherein for a region determined by said region determining unit as being a solid region, said correcting unit converts image data into dot data.

7. The image processing apparatus according to claim 1, wherein said region determining unit determines, per page, a region of said image data stored.

8. The image processing apparatus according to claim 1, wherein said correcting unit performs image correction per job so that an output operation of one job can be performed without interruption.

9. The image processing apparatus according to claim 1, wherein when image data for a plurality of jobs are stored in said storage portion, said correcting unit performs image correction such that an output operation of said plurality of jobs can be performed without interruption.

10. An image processing method for processing an image formed by an image forming apparatus that forms an image using a recording material, comprising the steps of:

storing image data in a storage portion;

determining an attribute of each region of the image data stored in said storage portion;

calculating an amount of the recording material required for forming by said image forming apparatus an image of the image data stored in said storage portion;

acquiring a remaining amount of the recording material in said image forming apparatus;

determining a need for correction of the image data stored in said storage portion by comparing the amount of the recording material calculated with the remaining amount of the recording material acquired; and correcting, when a correction is determined to be necessary, the image data stored in said storage portion using a method corresponding to said determined attribute and taking into account said amount of the recording material calculated and said remaining amount of the recording material acquired.

11. The image processing apparatus of claim 1, further comprising an image formation portion using a recording material to form an image.

12. The image processing apparatus of claim 11, further comprising a setting unit for setting an image forming condition of said image forming portion according to said determined region.

* * * * *